Nov. 1, 1927.                                          1,647,221
C. A. GEATTY
BRAKE BAND AND LINING
Filed April 14, 1925
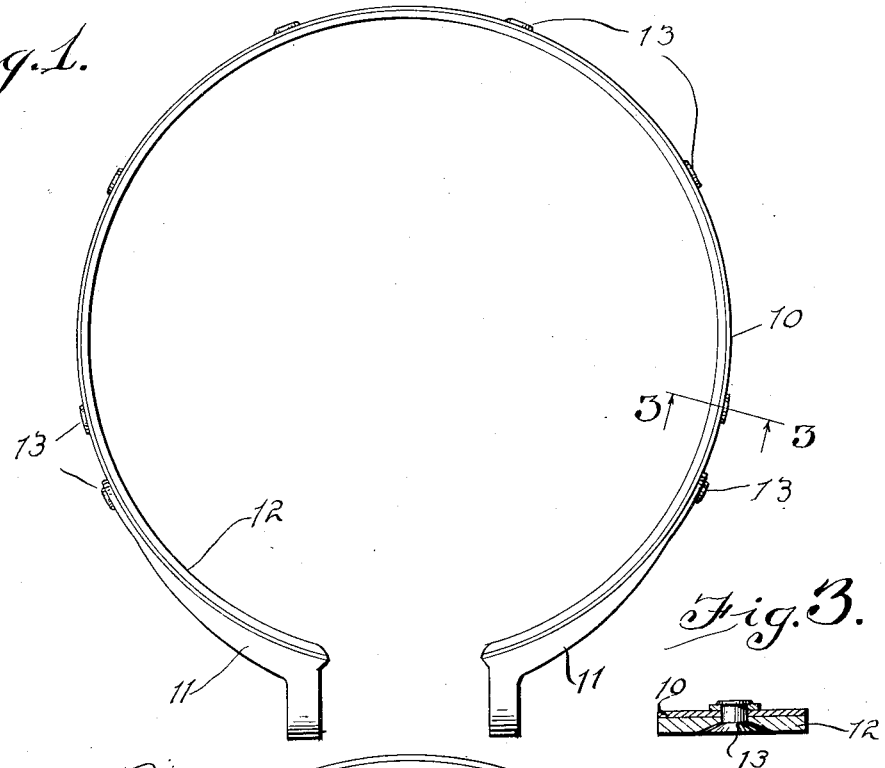
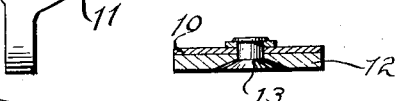
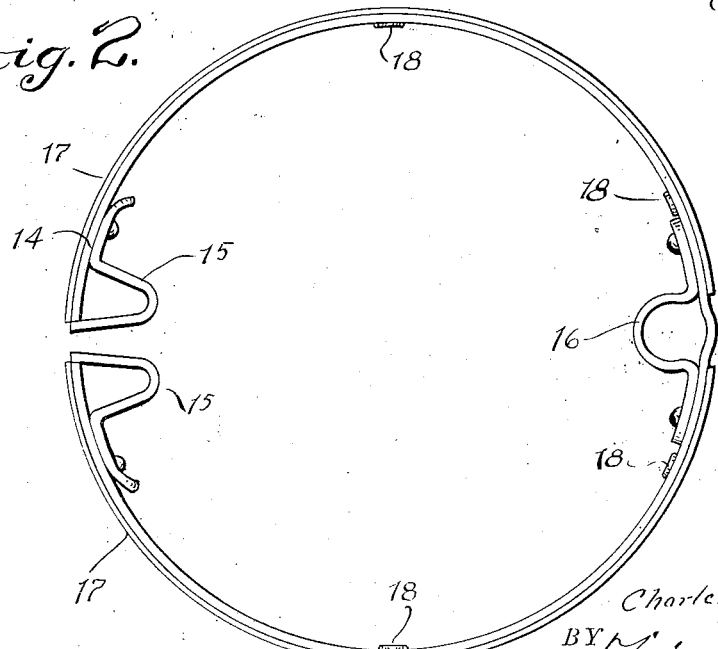
INVENTOR.
Charles A. Geatty,
BY
ATTORNEY Patented Nov. 1, 1927.

1,647,221

UNITED STATES PATENT OFFICE.

CHARLES A. GEATTY, OF ELKRIDGE, MARYLAND.

BRAKE BAND AND LINING.

Application filed April 14, 1925. Serial No. 23,089.

This invention relates to brake and transmission bands and linings therefor.

One important object of the invention is to provide an improved form of lining for brake and transmission bands.

A second object of the invention is to provide a band for this purpose having a lining of an alloy fixed thereto and arranged, under thermostatic changes, to produce flexure of the band from its normal shape.

A third object of the invention is to provide a metallic brake band with a metallic lining having a different linear co-efficient of expansion under heat than the band.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a side view of a typical form of transmission band or external brake band as constructed in accordance with this invention.

Figure 2 is a side view of a typical form of band for internal brakes as constructed in accordance herewith.

Figure 3 is a section on the line 3—3 of Figure 1.

In Figure 1 there is disclosed a transmission brake having the usual band 10 provided at each end with lugs 11 to receive the operating means, the latter not being here shown. Within this band a lining 12 is secured by rivets 13.

In Figure 2 there is shown a band 14 having at its ends the lugs 15 for attachment of the operating means and intermediate its ends a lug 16 for the hanger, neither the operating means nor hanger being here shown. On the exterior of this band is fixed the liner strips 17, these being secured by rivets 18.

The construction above described is that common to such devices but the invention resides in the peculiar material employed for the liners and its cooperation with the material of the band itself. The linings 12 and 17 are rigid metallic linings formed of an alloy of lead, antimony and copper to which has been added sulphur, such an alloy being fully described in my copending application for patent on alloys, filed of even date herewith and bearing the Serial Number 23,088 filed April 14, 1925. This alloy has a co-efficient of linear expansion under heat changes which is different from that of the band itself, steel being commonly used for the latter although I do not confine myself to the use of this particular material for the bands but may use such other material which I may find adapted for the purpose. However, whatever the material used may be the differences between the linear coefficients of expansion of the band and lining is such as to produce, under prolonged application of the brake, a flexure of the brake away from the drum thus temporarily releasing the brake and allowing the parts to cool whereupon they will be automatically, by the flexure due to such cooling, be again brought into braking engagement. The advantage of this will be apparent if an example be taken of an automobile running away down hill. Under such conditions, with the brake commonly used, continued application of the brake soon burns out the lining and the operator is left helpless. Accordingly expert operators, in such cases, apply and release the brake alternately but it is not common for the drivers of motor cars to be experts so that the average driver burns his brakes out and is left helpless. With the present construction, however, this alternate release and application is automatically effected. With steel bands I have found, for internal brakes, that a lining formed from lead 95 parts, antimony 3 parts, copper 2 parts and sulphur 5 parts, all by weight, is especially adapted for the purpose.

The liner is, of course, secured fixedly to the band as is the case in all thermostatic bars of two different metals.

Now, while the proportions given above are suitable for internal brakes where the purpose is to move the band away from the drum by contracting its curvature it is obvious that different materials may be best for use for the larger band in an external brake and the proportions of the alloy may be somewhat varied if precisely the same effect is to be produced. However, as the lining is always next the drum a lining having a linear coefficient of expansion greater than that of the band is what is essential.

It will also be observed that this construction prevents overheating of the brakes, that there is nothing to catch fire, the lining is unaffected by absorption of moisture from the atmosphere, does not rust and will not slip under wet or oily conditions to any injurious extent.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In combination, a brake band, and a metallic lining for the band formed from an alloy containing lead, antimony and copper and having a greater coefficient of linear expansion under temperature variations than the band.

2. In combination, a brake band, and a metallic lining for the band formed from an alloy containing lead, antimony, copper and sulphur having a greater coefficient of linear expansion under temperature variations than the band.

3. A thermostatic brake band and liner consisting of two rigidly connected metal members arranged to flex the band and liner from braking engagement with a drum under the influence of heat increase.

4. A thermostatic brake band and liner for automobiles and consisting of two rigidly connected metal members of different compositions concentrically arranged and having such co-efficients of linear expansion under increasing and decreasing temperatures as to decrease and increase respectively the braking pressure exercised during service application of the brake of said automobile.

In testimony whereof I affix my signature.

CHARLES A. GEATTY.